A. P. LOFSTRAND.
AUTOMATIC GRAIN SHOCKER.
APPLICATION FILED JULY 25, 1919.
1,373,252. Patented Mar. 29, 1921.
3 SHEETS—SHEET 1.
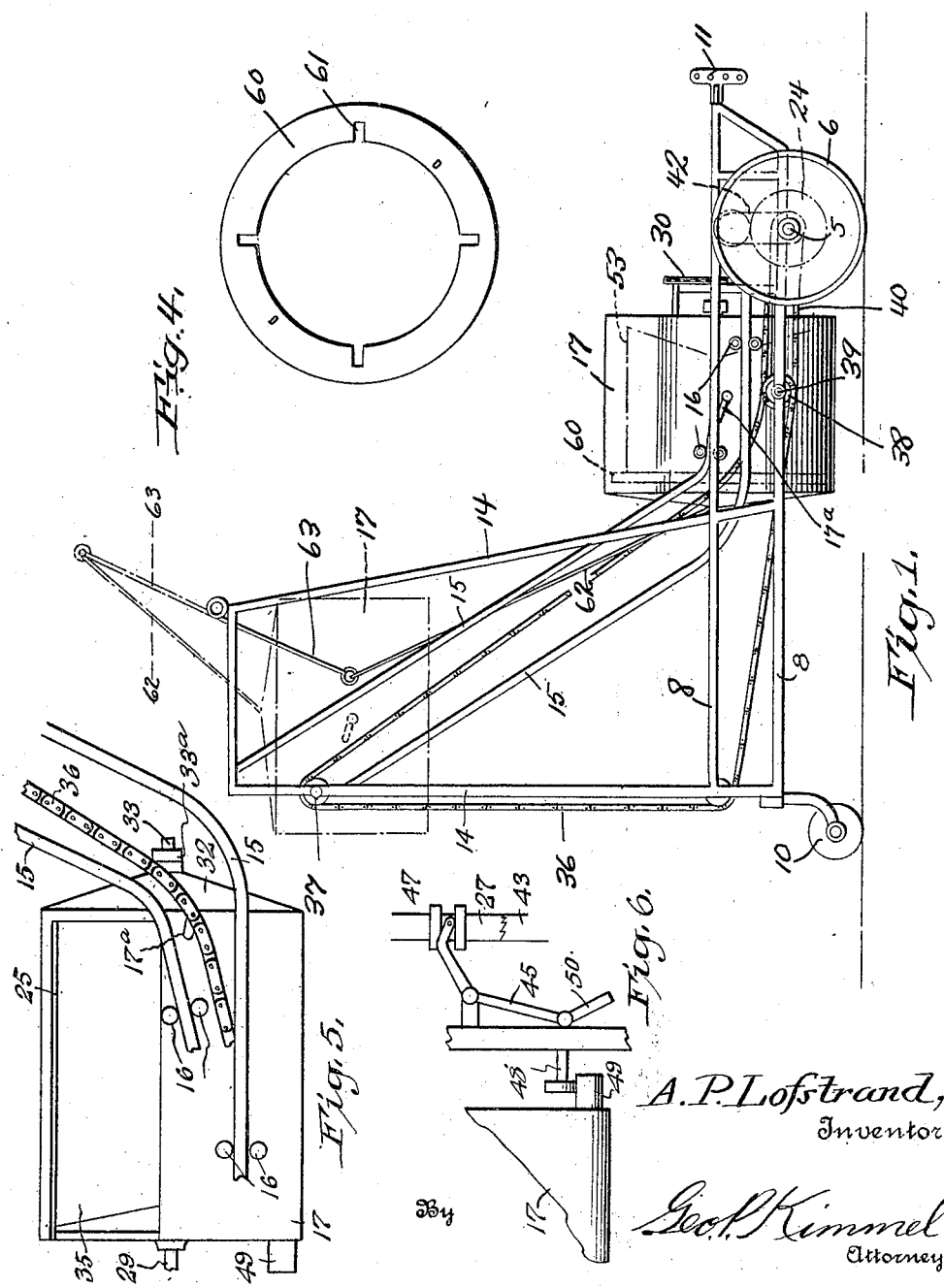
A. P. Lofstrand, Inventor
By Geo. P. Kimmel, Attorney

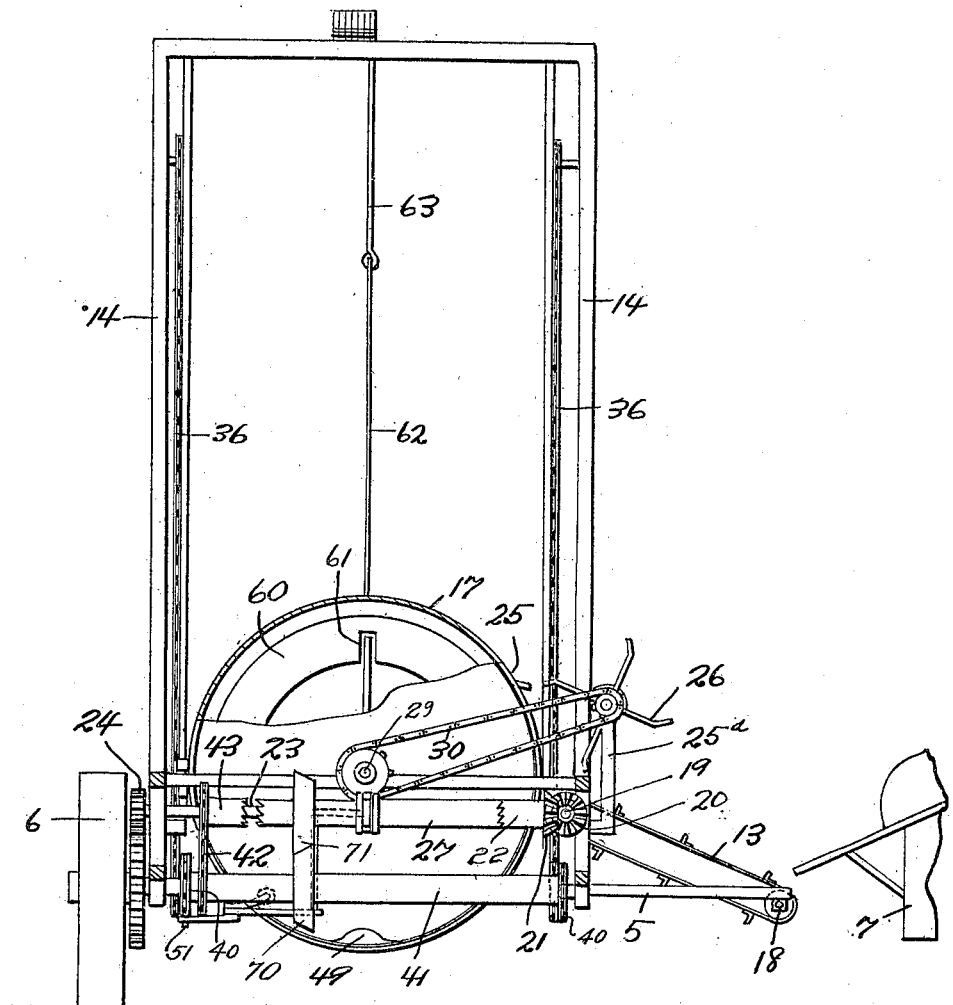

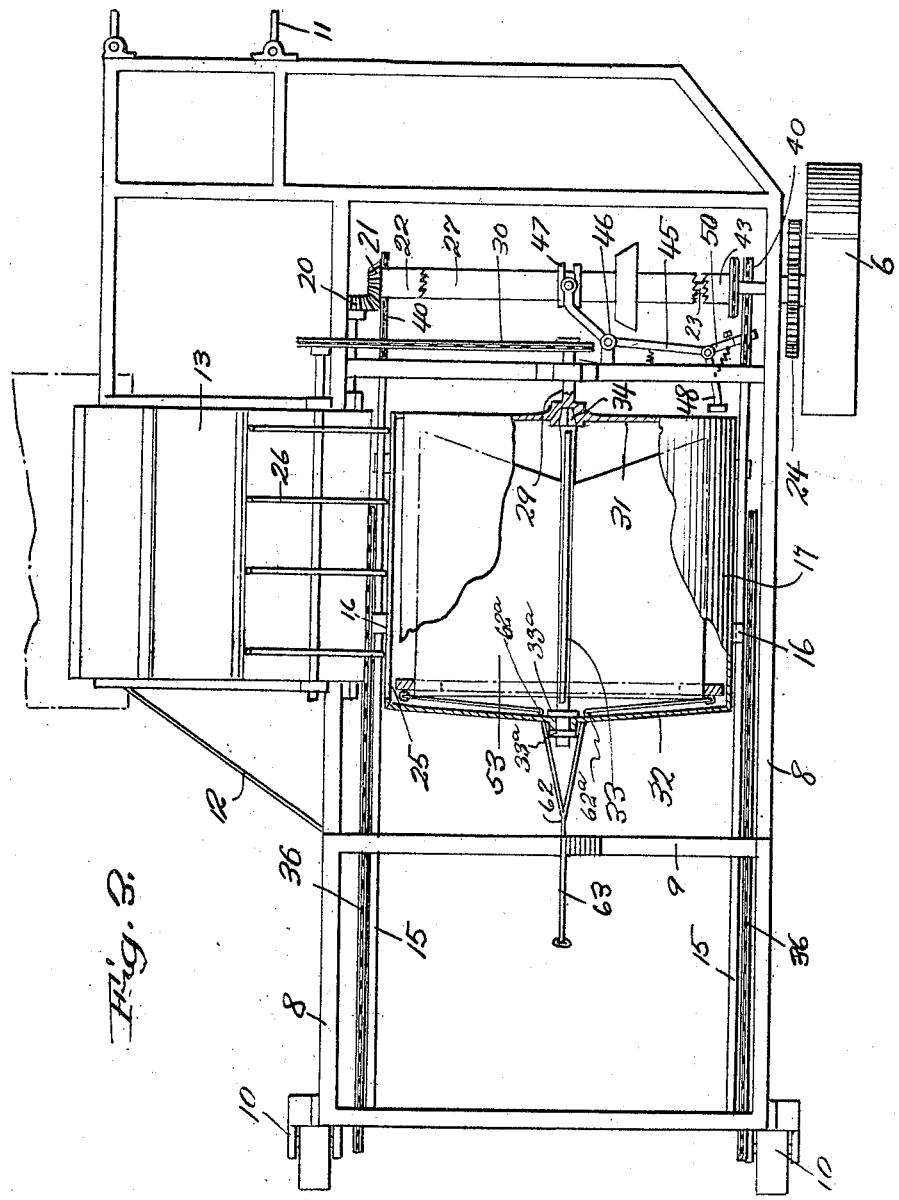

UNITED STATES PATENT OFFICE.

ALBIN P. LOFSTRAND, OF EDMONTON, ALBERTA, CANADA.

AUTOMATIC GRAIN-SHOCKER.

1,373,252.  Specification of Letters Patent.  Patented Mar. 29, 1921.

Application filed July 25, 1919. Serial No. 313,414.

*To all whom it may concern:*

Be it known that I, ALBIN P. LOFSTRAND, a citizen of the United States of America, residing at Edmonton, in the Province of Alberta and Dominion of Canada, have invented certain new and useful Improvements in Automatic Grain-Shockers, of which the following is a specification.

This invention has for its object to provide an improved shocker designed for application to a harvesting machine arranging the bundles of grain in shocks and subsequently depositing the shocks in an upright position on the ground.

Another object is the provision of a machine of this character in which the rotary movement of one of the supporting wheels for the shocker frame structure is utilized to operate the feeding and shocking mechanisms, the latter being automatically controlled by improved types of clutch operating devices arranged to alternately apply power to the shock forming and feeding mechanisms.

With these and other objects in view as will appear as the description proceeds the invention comprises the novel features of construction combination of elements and arrangement of parts which will be more fully described in the following specification and set forth with particularity in the claims appended hereto.

Figure 1 represents a side elevation of the improved shocker,

Fig. 2 represents a front elevation thereof, illustrating a fragment of the harvester, Fig. 3 represents a plan view of the automatic shocker, partly in section, Fig. 4 represents a plan view of the ejecting ring removed from the bundle receiving cylinder.

Fig. 5 is a fragmental elevation of the side of the receptacle, shown in Fig. 1.

Fig. 6 is a fragmentary plan showing the clutch mechanism of Fig. 3.

Referring to the drawing in detail, wherein similar reference numerals designate corresponding parts throughout the several views the numeral 5 indicates the front axle which is supported at one terminal upon the wheel 6 and is adapted for connection at its opposite terminal with a portion of a harvester indicated at 7 in Fig. 2. The supporting frame structure consists of opposed pairs of superposed side beams 8 connected at spaced intervals by the transverse beams 9, the rear beam being connected with casters 10 whereby the rear portion of the frame structure is movably supported upon the ground. The front portion of the frame structure is provided with clevises 11 designed for connection with a draft animal or device by which the shocker is propelled and the inside of the frame structure or that side adjacent the harvester 7 is provided with supplementary frame structure 12 forming a support for the endless conveyer 13 to be hereinafter more fully described. A plurality of uprights 14 is supported upon the rear portion of the frame structure of the shocker and supports a pair of parallel track rails 15 engaged by pairs of rollers 16 arranged on the opposite sides of a cylindrical bundle receiving receptacle 17. The track rails 15 are arranged at an inclination upon the uprights 14 and the rollers 16 of the receptacle 17 are so arranged that when engaged with the upper portion of the track rails 15 the receptacle assumes a vertical position with its open end directed downwardly. The forward terminals of the track rails 15 are curved and extended horizontally so as to cause the receptacle 17 to assume a horizontal position as the guide rollers 16 move downwardly thereon during descent of the receptacle from elevated position.

The endless conveyer 13 is supported upon superposed shafts 18 and 19 which are journaled in the supplementary and main frames respectively and the upper shaft 19 is provided terminally with a bevel gear wheel 20 which meshes with a corresponding gear wheel 21 on the terminal of a clutch member 22 which latter is loosely mounted upon a horizontally disposed shaft 23 journaled in the main frame structure 8 and having connection with the supporting wheel 6 through a train of gear wheels 24. When the member 22 is clutched with the shaft 23 the movement of the latter is transmitted to the endless conveyer 13 causing the bundles of grain deposited thereon from the harvester 7 to travel upwardly therewith and enter the opening 25 in the cylindrical receptacle 17. A pair of supplementary uprights 25ª is arranged upon the main frame structure 5 adjacent the entrance opening 25 in the receptacle and rotatably support a reel 26 provided with a series of radiating arms designed, during rotary movement of the reel, to feed the bundles of grain into the entrance opening 25 and, during inactivity of the reel to prevent the admission of the bundles of grain to the receptacle 17, as when the latter is moving upwardly upon the track rails 15 to dump the shock of bundles contained therein. A relatively movable clutch member 27 is keyed for longitudinal movement upon the shaft 23 engageable with the rotatable clutch element 22 to establish a driving connection between the shaft 23 and the endless conveyer 13 whereby the latter is operated.

A stub shaft 29 is journaled in one of the front transverse members 9 of the main frame structure and is connected by a chain 30 with the shaft of the reel 26 whereby rotary movement thereof is transmitted to the stub shaft 29 and to the circular plate 31 carried thereby. The rotary plate 31 is arranged in the front open end of the receptacle 17 and constitutes a front wall or closure plate therefor preventing accidental displacement of the bundles of grain contained therein during filling and constituting a stop for limiting the forward movement of the receptacle as the latter returns to normal position subsequent to its descension along the inclined portions of the track rails 15. The closed rear wall 32 of the receiving receptacle is provided with a forwardly extending stub shaft 33 provided with a tapered extremity adapted to engage in a correspondingly shaped socket 34 formed axially of the plate 31 whereby a driving connection between the receptacle and the shaft 29 is established when the receptacle is in its normal horizontal position as illustrated in full lines in the drawings.

Endless drive chains 36 are extended over guide pulleys 37 arranged in superposed relation upon the opposite sides of the uprights 14 and extend forwardly over drive wheels 38 supported upon relatively short shafts 39 journaled in the side members 8 of the main frame structure. The inclined portions of the chains 36 are connected with the receptacle 17 as at 17ª whereby the latter is moved to elevated position during movement of the chains 36 in one direction and subsequent to the elevation of the receptacle and the discharge of the shock therefrom the chains 36 are disconnected from the driving member, as will be hereinafter more fully described thereby permitting the receptacle to return by gravity to its initial horizontal position disposing the entrance opening 25 opposite the inner terminal of the endless conveyer 13. The short shafts 39 are connected by chains 40 with a sleeve 41 loosely mounted upon the front axis 5 intermediate the side beams 8 of the frame structure. The sleeve 41 is connected by a drive chain 42 with a relatively rotatable clutch member 43 journaled upon the horizontal shaft 23 adjacent the terminal of the longitudinally movable clutch member 27 opposite the clutch member 22. As will be understood, the clutch member 27 is adapted for alternate engagement with the rotatable clutch members 22 and 43 to alternately establish driving connection between the shaft 23 and said clutch members. As the clutch member 43 is engaged by the clutch member 27 a driving connection between the shaft 23 and the sleeve 41 is established and due to the connection to said sleeve with the shafts 39 through the chains 40 the drive chains 36 are actuated to elevate the receptacle 17, the rollers 16 of the latter traveling upon the guide rails 15.

A clutch actuating lever 45 is pivotally mounted at 46 upon the frame structure 8 and is provided with a bifurcated terminal engaged between a pair of collars 47 secured intermediate the terminals of the longitudinally movable clutch member 27 whereby the latter is alternately engaged with the clutch members 22 and 43 during oscillatory movement of the lever 45. One terminal of the lever 45 is provided with a lateral extension or arm 48 carrying a bearing roller engageable by a cam 49 formed upon the circular plate 31 whereby during rotary movement of the latter the arm 48 is engaged to swing the lever 45 so as to engage the clutch member 27 with the clutch member 43 and thus establish a driving connection between the shaft 23 and the drive chains 36 through the clutch member 43, chain 42, sleeve 41 and chains 40. A spring retained arm 50 is pivotally secured to the arm carrying terminal of the lever 45 and is engageable by a pin 51 carried by one of the chains 40 whereby the lever 45 is swung in the opposite direction to engage the clutch 27 with the clutch member 22 and thus establish a driving connection between the shaft 23 and the endless conveyer 13.

As will be understood, the rear terminal of the shaft 33 is rotatably mounted in the rear wall 32 of the receptacle so as to permit the shaft to freely rotate therein while said shaft is held against longitudinal movement with relation to the receptacle by spaced collars 33ª. A plurality of radiating plates or blades 53 is arranged upon the shaft 33 dividing the interior of the receptacle into a plurality of segmental compartments adapted to receive the bundles of grain and as the bladed shaft is revolved within the receptacle the bundles are formed into a shock.

In operation, the bundles of grain are deposited upon the endless conveyer 13 from the harvester 7 and moving upwardly therewith are projected through the entrance opening 25 of the receptacle 17, turning the reel 26 as they pass. As the space between two adjacent blades 53 is filled by a bundle of grain the shaft 33 is revolved by its chain connection 30 with the reel 26 so as to move the bundle within the receptacle 17 and the compartments between the several blades are successively filled until the entire receptacle is filled with the bundles of grain. At such time, the cam 49 strikes against the roller or the terminal of the arm 48 swinging the latter in such manner as to release the clutch member 22 from the shaft 23 and engage the clutch member 27 with the clutch member 43 thus establishing a driving connection between the horizontal shaft 43 and the chains 36 through the chain 42, sleeve 41 and chains 40. As the receptacle 17 moves upwardly along the track rails 15, incident to the travel of the chains 36 the terminal of the shaft 33 is withdrawn from the socket 34 and the shock falls from the lower open end of the receptacle upon the ground. As the receptacle 17 approaches the limit of its upward movement, or that position suggested in dotted lines in Fig. 1, the pin 51 on one of the chains 40 engages the spring arm 50 of the lever 45 swinging the latter in the opposite direction and causing the clutch member 27 to be moved into engagement with the clutch member 22 thereby reestablishing a driving connection between the shaft 23 and the endless conveyer 13, reel 26 and shaft 29. When the clutch member 43 is released from engagement with the clutch member 27 the receptacle returns by gravity to its initial horizontal position as shown in full lines in the drawings and the tapered terminal of the shaft 33 engages in the tapered socket 34 reëstablishing a driving connection between the shaft 29 and shaft 33 causing a continuation of the rotary movement of the shaft 33.

An ejecting ring 60 having recesses 61 is slidably mounted upon the blades 53 internally of the receptacle 17 and is connected by a flexible member 62 with a spring arm 63 carried by the upper portions of the uprights 14. The lower extremity of the flexible member 62 is forked and extended through apertures 62ª in the wall 32 and connected with the ring 60 at diametrically opposite points. As the receptacle 17 moves forwardly to horizontal position the tension of the spring arm 63 withdraws the adjusting ring 60 to its position in the rear portion of the receptacle however if the receptacle is elevated the tension of the spring arm 63 is relieved and the weight of the ring bearing upon the shock contained in the receptacle ejects the latter.

A relative stationary friction clutch member 70 is adjustably secured upon the sleeve 41 and rotatable therewith and is engageable at times, with a friction disk 71 carried by the movable clutch member 27. The members 70 and 71 are designed to retard the descent of the receptacle 17 after the latter has been elevated and to cause depositive return of the receptacle to initial position thereby assuring engagement of the terminal of the shaft or axle 33 in the socket 34. However, there is sufficient play between the friction clutch members as to permit the member 71 to revolve independently of the member 70 when the receptacle has reached its horizontal receiving position.

What I claim is:

1. In combination, a wheel mounted frame structure, a shock forming receptacle movably mounted in the frame structure and provided with an entrance opening, means for elevating the receptacle, and means connecting one of the supporting wheels of the frame structure with the elevating means whereby the latter is operated by movement of the frame structure.

2. In combination, a wheel mounted frame structure, a shock forming receptacle having an open end and an entrance opening and normally disposed in a horizontal position, means for moving said receptacle to a vertical elevated position to cause the contents to fall through the open end thereof, and means connecting one of the supporting wheels of the frame structure with the elevating means for actuating the latter.

3. In combination, a wheel mounted frame, a movable shock forming receptacle supported in said frame structure and provided with an entrance opening, a bladed member rotatably mounted in the receptacle, means for elevating the receptacle, and means for alternately establishing a driving connection between one of the supporting wheels of the frame structure and the elevating means and rotatable member.

4. In combination, a wheel mounted frame structure, a shock forming receptacle movably supported therein, a rotatable turning element received within the receptacle when the latter in its lowermost position, means for elevating said receptacle, and automatic actuating means to alternately establish a driving connection between the turning element and elevating means.

5. In combination, a wheel mounted frame, a shock forming receptacle provided with an open end and an entrance opening and normally disposed in horizontal position, means for elevating said receptacle to cause the contents thereof to fall through the open end, a rotatable turning element received within the receptacle when the latter is in its horizontal position, means for feeding bundles of grain through the entrance opening of the receptacle, a bundle operated reel, a driving connection between the reel and turning element, an automatically actuated means to alternately establish a driving connection between one of the supporting wheels of the frame structure and the turning element and elevating means.

6. In combination, a wheel mounted frame structure, a shock forming receptacle movably supported in said frame structure, means for elevating said receptacle, a rotatable turning element journaled in and carried by the receptacle, means for elevating said receptacle, a driving element supported in said frame structure, and engageable with the turning element when the receptacle is in its lowermost position, and means for alternately establishing a driving connection between one of the supporting wheels of the frame structure and the driving element and the elevating means.

7. In combination, a wheel mounted frame structure, a shock forming receptacle having an entrance opening and an open end and normally disposed in a horizontal position, means for elevating the receptacle and tilting the latter to a vertical position to cause the contents thereof to fall therefrom, a rotatable turning element journaled in and carried by the receptacle, a driving element journaled in said frame structure and constituting a closure for the open end of the receptacle when the latter is in its lowermost horizontal position, and means for alternately establishing a driving connection between one of the supporting wheels of the frame structure and the driving element and the elevating means.

8. In combination, a wheel mounted frame structure, a movable shock forming receptacle provided with an entrance opening, and intermittently operated means for feeding bundles of grain through the entrance opening of the receptacle, said feeding means, when inoperative constituting means for preventing admission of bundles of grain to the receptacle.

9. In combination, a wheel mounted frame, a shock forming receptacle provided with an entrance opening, means for elevating the receptacle, means for feeding bundles of grain through the entrance opening of the receptacle, and means for alternately establishing a driving connection between one of the supporting wheels of the frame structure and the elevating means and the feeding means whereby the latter is rendered inoperative during elevation of the receptacle.

10. In combination, a wheel mounted frame structure, a shock forming receptacle provided with an entrance opening, means for elevating the receptacle, means for feeding bundles of grain through the entrance opening of the receptacle, a rotatable element having driving connection with one of the supporting wheels of the frame structure, clutches mounted on the rotatable element, driving connections between the rotatable elements of the clutches and the feeding means and elevated means, and means automatically controlled from the feeding means and the elevating means to actuate the clutches and alternately establish a driving connection between the rotatable element and the feeding means and elevating means.

11. In combination, a frame structure, a receptacle movably supported therein provided with an entrance opening, bundle conveying means for projecting bundles through said opening, means for actuating the conveying means, a bundle operated reel, and a driving connection between the reel and said receptacle for moving the latter coincident with the passage of a bundle beneath the reel.

12. In combination, a frame structure, a receptacle movably supported therein provided with an entrance opening, bundle conveying means for projecting bundles through said opening, means for actuating the conveying means, a bundle operated reel, division blades rotatably supported in said receptacle, and a driving connection between the reel and said division blades for moving the latter coincident with the passage of a bundle beneath the reel.

13. In combination, a wheel mounted frame structure, a shock forming receptacle normally disposed in a horizontal position, means for moving said receptacle to a vertical elevated position to cause discharge of the contents thereof, means connecting one of the supporting wheels of the frame structure with the elevating means for intermittently actuating the latter, said elevating means adapted, when released, to permit the receptacle to return by gravity to initial position, and means for retarding descent of the receptacle.

In testimony whereof, I affix my signature hereto.

ALBIN P. LOFSTRAND.